United States Patent
Ruback et al.

(10) Patent No.: US 7,366,673 B2
(45) Date of Patent: Apr. 29, 2008

(54) SELECTIVE ENABLEMENT OF SPEECH RECOGNITION GRAMMARS

(75) Inventors: Harvey M. Ruback, Loxahatchee, FL (US); Steven G. Woodward, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 09/882,472

(22) Filed: Jun. 15, 2001

(65) Prior Publication Data

US 2003/0046074 A1   Mar. 6, 2003

(51) Int. Cl.
*G10L 11/00* (2006.01)
(52) U.S. Cl. .............. 704/277; 704/270.1; 704/255
(58) Field of Classification Search ........... 704/200, 704/201, 270.1, 7, 277, 255
See application file for complete search history.

(56) References Cited

U.S. PATENT DOCUMENTS

| | | | | |
|---|---|---|---|---|
| 5,054,082 A * | 10/1991 | Smith et al. | ............... | 704/275 |
| 5,855,003 A * | 12/1998 | Ladden et al. | .............. | 704/270 |
| 5,960,399 A * | 9/1999 | Barclay et al. | ........... | 704/270.1 |
| 6,078,886 A * | 6/2000 | Dragosh et al. | ............ | 704/270 |
| 6,119,087 A * | 9/2000 | Kuhn et al. | ................. | 704/270 |
| 6,366,886 B1 * | 4/2002 | Dragosh et al. | ......... | 704/270.1 |
| 6,408,272 B1 * | 6/2002 | White et al. | ............. | 704/270.1 |
| 6,424,945 B1 * | 7/2002 | Sorsa | ..................... | 704/270.1 |
| 6,434,523 B1 * | 8/2002 | Monaco | ...................... | 704/257 |
| 6,453,290 B1 * | 9/2002 | Jochumson | ................. | 704/231 |
| 6,456,974 B1 * | 9/2002 | Baker et al. | ............. | 704/270.1 |
| 6,560,590 B1 * | 5/2003 | Shwe et al. | .................. | 706/55 |
| 6,604,075 B1 * | 8/2003 | Brown et al. | ............. | 704/270.1 |
| 6,604,077 B2 * | 8/2003 | Dragosh et al. | ......... | 704/270.1 |
| 6,615,172 B1 * | 9/2003 | Bennett et al. | ............. | 704/257 |
| 7,050,977 B1 * | 5/2006 | Bennett | .................... | 704/270.1 |
| 7,058,643 B2 * | 6/2006 | Vailaya | ...................... | 707/101 |
| 7,058,890 B2 * | 6/2006 | George et al. | ........... | 704/270.1 |

* cited by examiner

*Primary Examiner*—Michael Opsasnick
(74) *Attorney, Agent, or Firm*—Akerman Senterfitt

(57) ABSTRACT

A method for processing speech audio in a network connected client device can include selecting a speech grammar for use in a speech recognition system in the network connected client device; characterizing the selected speech grammar; and, based on the characterization, determining whether to process the speech grammar locally in the network connected client device, or remotely in a speech server in the network. Selecting can include establishing a communications session with a speech server; and, querying the speech server for a speech grammar over the established communications session. Selecting can further include registering the speech grammar in the recognition system.

5 Claims, 4 Drawing Sheets

SELECTIVE ENABLEMENT OF SPEECH RECOGNITION GRAMMARS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition and more particularly to enabling speech recognition grammars.

2. Description of the Related Art

To recognize the spoken word, a speech recognition system can process analog acoustical information into computer readable digital signals that can be recognized as core components of speech which can be further recognized as discrete words. Still, to accurately recognize the spoken word, a speech recognition system relies not only on acoustical information, but also on the context in which the word is spoken. More particularly, speech recognition grammars can indicate the context in which speech sounds are recognized.

To determine the context in which a word is spoken, speech recognition systems can include speech recognition grammars which can predict words which are to be spoken at any point in a spoken command phrase. Essentially, from a speech recognition grammar, a speech recognition system can identify the words which should appear next in a spoken phrase. For example, given the speech recognition grammar, <root>=call<namelist>

|display<itemlist>.

<namelist>=Bill|John.

<itemlist>=names|messages.

if a speaker recites, "Call John", once the speech recognition system determines that the word "call" has been spoken, the speech recognition system can conclude that the only possible words that can be spoken next in the command phrase are the words "Bill" and "John". Hence, the use of speech recognition grammar can result in more accurate speech recognition since the list of possible words which can be spoken at any point in a spoken phrase is limited based upon the previously spoken words.

Notwithstanding, despite the assistance of a speech recognition grammar, the use of a speech recognition system in networked client device can pose significant problems. In particular, unlike performing speech recognition in a stand-alone desktop computer, networked client devices often can lack similar processing power. Whereas desktop computers can include high processing power CPUs and vast fixed storage, networked client devices, often in view of power consumption and conservation concerns, include low processing power CPUs and limited fixed storage. Thus, performing complex computer processes in a networked client device can be problematic at best. In the worst case, storing larger, more complex speech recognition grammars may not be possible in a networked client device.

Presently two methods are employed in performing speech recognition in a networked client device. First, speech recognition can be performed entirely within the confines of the networked client device. Still, processing complex speech recognition grammars in a networked client having low processing power, such as a handheld client, can prove problematic due to the processing constraints of the networked client. In particular, such networked clients cannot provide realtime feedback often required by speech recognition applications because of processing power limitations of the networked client.

In a second known method for performing speech recognition in a networked client device, speech recognition is performed entirely in a server communicatively linked to the networked client. Processing speech recognition grammars entirely in a server communicatively linked to the networked client can surmount the processing limitations posed by low processing powered networked clients. Still, processing speech recognition grammars entirely in a server can prove problematic inasmuch as the processing of the speech recognition grammar can be limited by available network resources.

Specifically, congested networks or those networks having constrained bandwidth can prevent realtime processing of speech audio in the server as can be required by some speech recognition applications. Notably, realtime processing of speech audio entirely in a server can prove problematic, even where the speech grammar used to process the speech audio, in itself, is not a complex speech recognition grammar. In this case, though the processing power of a server is not required, realtime speech recognition is inhibited by the limitations of the network.

SUMMARY OF THE INVENTION

A method for processing speech audio in a network connected client device can include selecting a speech grammar for use in a speech recognition system in the network connected client device; characterizing the selected speech grammar; and, based on the characterization, determining whether to process the speech grammar locally in the network connected client device, or remotely in a speech server in the network. In one aspect of the invention, the selecting step can include establishing a communications session with a speech server; and, querying the speech server for a speech grammar over the established communications session. Additionally, the selecting step can further include registering the speech grammar in the speech recognition system. In another aspect of the invention, the speech grammar can be stored in the network connected client device.

Notably, the characterizing step can include determining whether the selected speech grammar is a complex speech grammar. Accordingly, the speech recognition system can dynamically determine the complexity of the speech grammar. Alternatively, the characterizing step can include identifying in the speech grammar a pre-determined characterization. In that case, the pre-determined characterization can be a pre-determined complexity. Alternatively, the pre-determined characterization can specify a pre-determined preference for processing the speech grammar either locally or remotely. Moreover, the pre-determined characterization can further specify a location of a server for remotely processing the speech grammar. In particular, where the speech recognition grammar is stored in the network connected client device, the speech recognition grammar can be transferred to the speech server if it is determined that the characterization step will require processing power not available in the network connected client device.

A network distributable speech grammar configured for distribution to network connected client devices can include a speech grammar; and, a pre-determined characterization of the speech grammar associated with the speech grammar. Notably, the pre-determined characterization can be embedded in the speech grammar. Alternatively, the pre-determined characterization can be separately stored in a file associated with the speech grammar. The pre-determined characterization can be a pre-determined complexity. Alternatively, the pre-determined characterization can specify a pre-determined preference for processing the speech grammar either locally or remotely. Finally, the pre-determined characterization can further specify a location of a server for remotely processing the speech grammar.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention provides for the selective enablement of a speech recognition grammar for use in a speech enabled application in a network connected client. More particularly, the present invention allows a speech recognition application executing in a network connected client to capitalize on the processing power of a speech server communicatively linked to the network connected client by enabling the remote use of a speech recognition grammar in the speech server. Yet, for less complex speech grammars, the speech recognition application can rely on the more limited local processing resources of the network connected client to locally process the speech grammar.

The present invention solves the problem of recognizing complex grammars on a low processing power system by allowing the developer of speech grammars to mark more complex speech grammars for decoding in the speech server rather than in a speech engine executing locally in a network connected client. Still, the present invention avoids the inefficiencies of always processing speech grammars in the server by permitting less complex speech grammars to be processed in the client. More particularly, in practice, when a speech enabled application executing in the client registers a speech recognition grammar, the speech enabled application can specify whether the speech grammar should be processed locally in the network connected client, or remotely in the speech server. Specifically, based on the complexity of the speech grammar, the speech recognition application can either enable the grammar for processing locally in the network connected client, or for processing remotely in the server.

Figure 1:
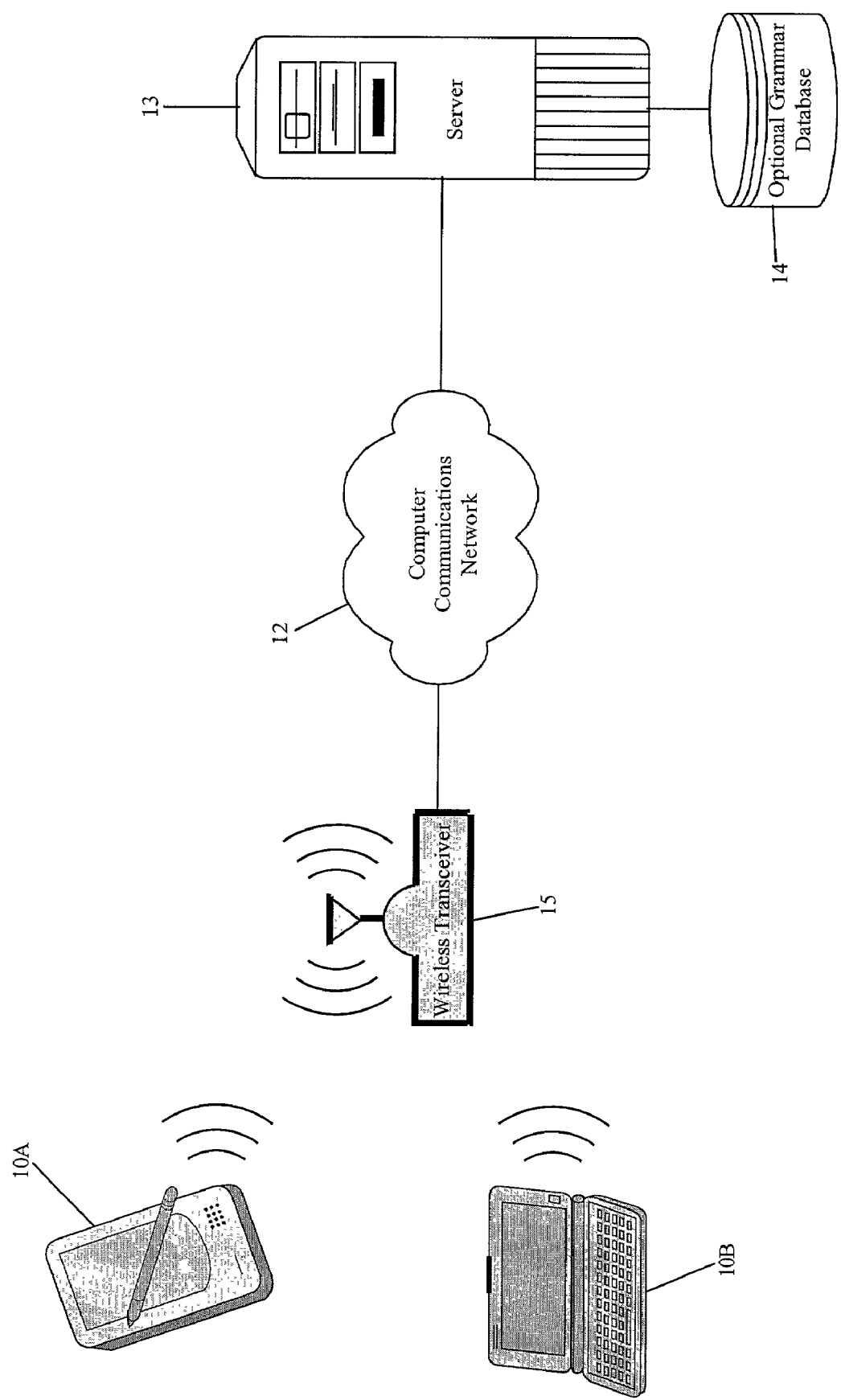
FIG. 1 is a pictorial representation of a computer communications network configured to perform speech recognition in network connected client devices based on speech recognition grammars stored in a network connected server.

Turning now to FIG. 1, a computer communications network is shown to be configured to perform speech recognition in network connected clients based on speech recognition grammars stored either in a network connected server or in the network connected client devices. As shown in FIG. 1, a computer communications network configured in accordance with the inventive arrangements can include a speech server 13 having a speech recognition grammar stored in grammar database 14, and network connected client devices 10A, 10B communicatively linked to each other through computer communications network 12. Notably, the network connected client devices 10A, 10B can include wireless devices such as a personal digital assistant (PDA), notebook computer, cellular or PCS telecommunications device. The wireless devices can be communicatively linked to computer communications network 12 through a wireless transceiver/bridge 15. Still, the invention is not limited in this regard. Rather, network connected client devices also can include embedded systems for use in vehicles or wearable computers.

Figure 2:
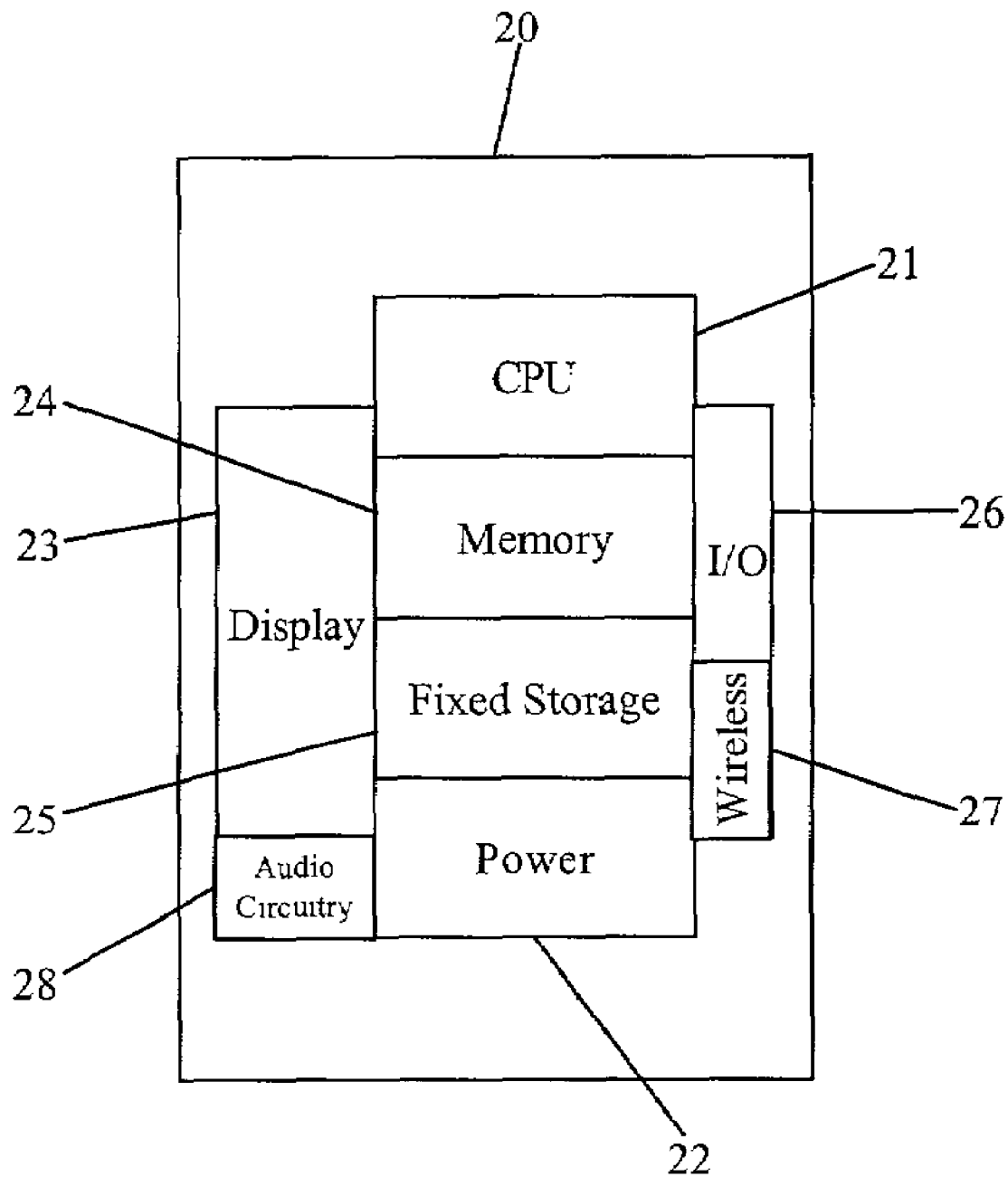
FIG. 2 is a schematic diagram of a network connected client device suitable for use in the system of FIG. 1.

FIG. 2 is a schematic diagram of an exemplary network connected client suitable for use in the system of FIG. 1. As shown in FIG. 2, network connected client device 20 can include a CPU 21, a power source 22, memory 24 and fixed storage 25. The network connected device 20 also can include audio circuitry 28 suitable for receiving and processing analog audio signals into digitized speech data for use in a speech recognition system. The audio circuitry 28 also can be used to synthesize digital speech data into analog speech signals. Thus, the audio circuitry 28 can be used in the same fashion as a conventional sound card.

The network connected client device 20 also can include input/output (I/O) circuitry 26 for receiving and transmitting data both to and from an input device such as a keyboard or pointing device. The I/O circuitry 26 also can include a wireless transmitter/receiver 27 for wirelessly transmitting and receiving data to and from a wireless transceiver such as the wireless transceiver 15 of FIG. 1. Such wireless transmitter/receivers are well-known in the art and are often deployed in such wireless type networks such as cellular digital packet data (CDPD) networks, PCS networks, pager-type communications networks and the like. Finally, the network connected device optionally can include a display 23 although the invention is not limited in this regard and the network connected client device 20 can rely on other non-visual means for interacting with a user.

Figure 3:
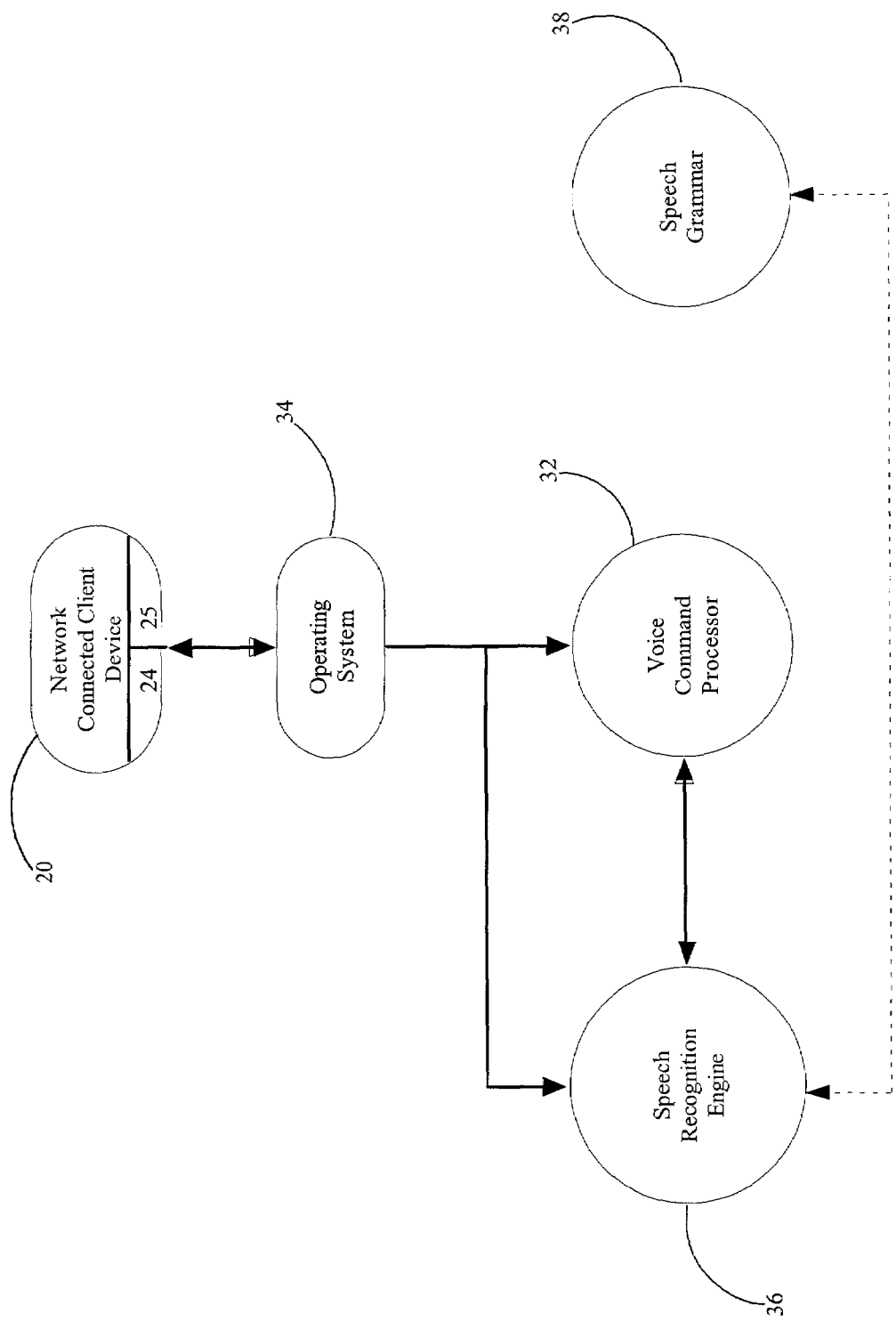
FIG. 3 is a schematic diagram of a systems architecture suitable for use in the network connected client device of FIG. 2.

FIG. 3 illustrates a preferred architecture for a speech recognition system which can be used in conjunction with the network connected device 20 of FIG. 2. As shown in both FIGS. 2 and 3, the network connected device 20 can include electronic random access memory 24 and fixed storage 25, for example a magnetic disk drive or flash memory. The network connected device 20 can also include an operating system 34 and a speech recognition engine 36. In the example shown, a voice command processor 32 is also provided; however, the invention is not limited in this regard, as the speech recognition engine 36 can be used with any other application program which can be voice enabled. For instance, the speech recognition engine 36 can be used with a speech-enabled to-do list in a PDA, a speech-enabled phone book in a cellular phone, a speech-enabled embedded navigation system in a vehicle, or any other speech-enabled application.

In FIG. 3, speech recognition engine 36 and voice command processor 32 are shown as separate application programs. It should be noted, however, that the invention is not limited in this regard, and that these various application programs could be implemented as more complex applications program. For example, the speech recognition engine 36 could be combined with the voice command processor 32. Moreover, the speech recognition engine 36 could be combined with any other application to be used in conjunction with the speech recognition engine 36.

In a preferred embodiment, which shall be discussed herein, the operating system 34 is an embedded operating system, such as QNX Neutrino® or Wind River System's VxWorks®. The operating system 34 is not limited in this regard, however, as the invention can also be used with any other type of computer operating system, such as WindowsCE® or WindowsNT®, each of which is available from Microsoft Corporation of Redmond, Wash. The method of the present invention can be implemented by a computer programmer to execute in the operating system 34 using commercially available development tools for the operating system 34 described above.

In operation, audio signals representative of sound received in a microphone (not shown) are processed within the network connected device 20 using the audio circuitry 28 of FIG. 2 so as to be made available to the operating system 34 in digitized form. The audio signals received by the audio circuitry 28 are conventionally provided to the speech recognition engine 36 either directly or via the operating system 34 in order to perform speech recognition functions. As in conventional speech recognition systems, the audio signals are processed by the speech recognition engine 36 to identify words spoken by a user into the microphone.

Significantly, the speech recognition engine 36 can use a speech recognition grammar 38 to assist in determining the context of the spoken words to more accurately convert spoken words to text. Upon initializing the speech recognition engine 36 a speech recognition grammar 38 can be selected for use in the particular speech-enabled application, for instance the voice command processor 32. The speech recognition grammar 38 can vary in complexity depending upon the particular speech-enabled application. For instance, in a basic voice command processor, the speech recognition grammar 38 can be a simple grammar. In contrast, for a speech-enabled address book and calendar, the speech recognition grammar 38 can be more complex.

In the present invention, the speech recognition grammar 38 can be stored in a speech grammar database in a speech server such as speech server 13 of FIG. 1. Alternatively, the speech recognition grammar 38 can be stored in a network connected client device 20 and uploaded to the speech server 13 only if the processing limitations of the network connected client device 20 require as much. Still, in the case where the speech recognition grammar 38 is stored in the speech server 13, upon initialization, the speech recognition engine 36 in the network connected client device 20 of FIGS. 2 and 3 can query the speech server 13 for an available speech grammar 38 and can select a suitable speech grammar 38. Subsequently, the speech recognition engine 36 can identify a processing preference in the selected speech grammar 38. Depending upon the identified preference, the speech recognition engine 36 can choose to process the selected speech grammar 38 either locally in the network connected client device 20, or remotely in the speech server 13.

The present invention can be realized in hardware, software, or a combination of hardware and software. Machine readable storage according to the present invention can be realized in a centralized fashion in one computer system, or in a distributed fashion where different elements are spread across several interconnected computer systems. Any kind of computer system or other apparatus adapted for carrying out the methods described herein is acceptable. A typical combination of hardware and software could be a general purpose computer system with a computer program that, when being loaded and executed, controls the computer system such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for the operating system 34 described above.

Figure 4:
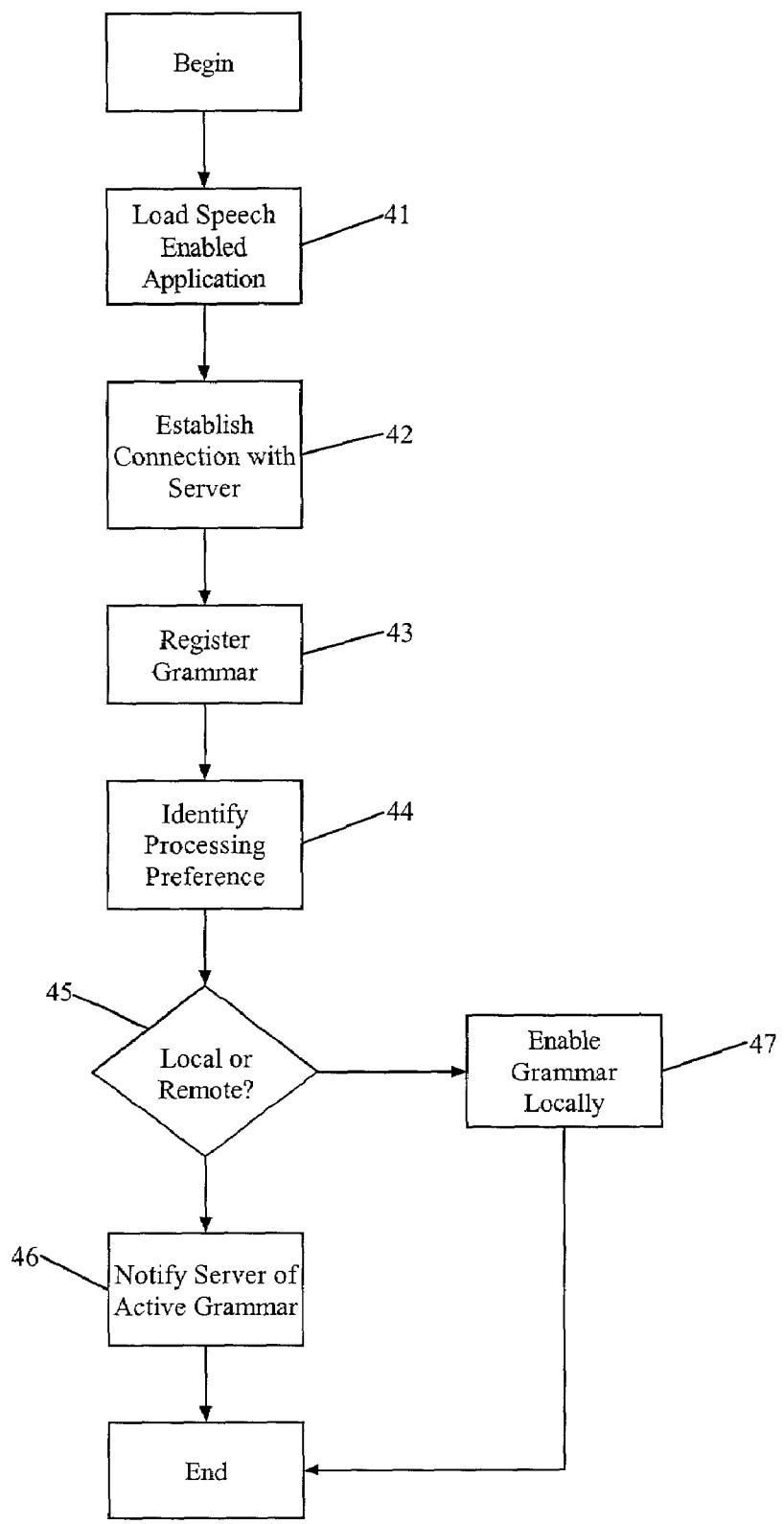
FIG. 4 is a flow chart illustrating a process for enabling a speech recognition grammar in accordance with the inventive arrangements.

The invention can be more fully understood by reference to the flow chart of FIG. 4 in which a method for selective enablement of speech recognition grammars is illustrated. As shown in FIG. 4, the method can begin in step 41 in which a speech recognition system can be loaded in a network connected client device. Once loaded, in step 42 the speech recognition system can establish a communications session with a speech server in which speech grammars can be stored. Still, the invention is not limited in this regard and the speech grammar can be stored in a more distributed fashion in a server elsewhere in the network. In the case of the distributed storage of speech grammars, the speech server can retrieve selected speech grammars from distributed storage on demand. Alternatively, the speech server can refer the network connected client device to the network location of a particular distributed speech grammar.

In step 43, the speech recognition system can select a particular speech grammar stored in the speech server, and can register the selected speech grammar for use with the speech recognition system. Significantly, in step 44 the speech recognition system can identify a processing preference associated with the selected speech grammar. More particular, each speech grammar can include therein a recommendation as to whether the speech grammar should be processed locally or remotely. Alternatively, in lieu of a recommendation, the speech grammar can include a characterization of the speech grammar, for instance the complexity of the speech grammar. Still, the invention is not limited in this regard and the speech recognition system can dynamically determine a processing preference by analyzing the selected speech grammar in order to characterize the same.

In decision step 45, the speech recognition system can determine whether to process the speech grammar locally in the network connected client, or remotely in a speech server. The speech recognition system can base this determination on the characterization of the selected speech grammar, for example the complexity of the speech grammar. For more complex speech grammars, the speech recognition system can choose to process the speech grammar remotely. In this case, in step 46, the speech grammar can be activated in the speech server for use by the network connected device. Otherwise, in step 47, for less complex speech grammars, the speech grammar can be enabled in the network connected device for local processing.

Thus, unlike prior art solutions to performing speech recognition in a network connected client in which speech grammars are processed either locally in the client or remotely in a server, the present invention permits processing both locally and remotely by intelligently selecting where particular speech grammars are to be processed. The invention solves the problem of recognizing complex speech grammars on a system with low processing power, such as a handheld client. By using this invention, a system with low processing power can perform recognition of small simple grammars requiring real-time feedback on the local processor and can also with a small latency (defined by the network speed and server processing power) process more complex grammars over a network. The result will be that the speech application could perform more complex recognition tasks than if it was trying to perform all the recognition on the local processor.

The invention claimed is:

1. A method for processing speech audio in a network connected client device comprising:

selecting a speech grammar for use in a speech recognition system in the network connected client device;

characterizing the selected speech grammar, wherein said characterization comprises determining a size and a complexity of said selected grammar, and wherein a preferred processing location is specified in said selected speech grammar;

determining a processing power of said client device and of a remote speech server, a speed of a network connection between said client device and said speech server, and a feedback requirement for said speech recognition system; and, based on the characterization of said selected speech grammar, said determined network connection speed, said determined processing power of the network connected client device and said remote speech server, and said feedback requirements, electing whether to process the entire selected speech grammar in said preferred location or another location different from said preferred location before processing the speech audio, wherein said preferred location specifies the network connected client device or the speech server, wherein if said preferred location specifies said speech server, said client device elects said client device if real-time feedback is required by said speech recognition system and a processing power of said client device is sufficient for said client device to process said selected speech grammar in real-time based on said size and said complexity of said selected grammar, and wherein if said preferred location specifies said client device, said client device elects said remote speech server if a latency in processing said selected speech grammar based on said network speed and said remote speech server processing power is sufficient to meet a feedback requirement of said speech recognition system.

2. The method of claim 1, wherein the selecting step comprises:

establishing a communications session with said remote speech server;

selecting a speech grammar stored in the network connected client device; and, uploading said selected speech grammar to said remote speech server.

3. The method of claim 1, wherein said characterizing step comprises:

identifying in said selected speech grammar an embedded pre-determined characterization of said size and said complexity of said selected speech grammar.

4. The method of claim 1, wherein the selecting step comprises:

establishing a communications session with said remote speech server; and, querying said remote speech server for a speech grammar over said established communications session.

5. The method of claim 4, wherein said selecting step further comprises:

registering said selected speech grammar in said speech recognition system.

* * * * *